UNITED STATES PATENT OFFICE 2,128,885

PROCESS OF PRODUCING ASPHALT IN SOLVENT REFINEMENT OF PETROLEUM SUBSTANCES

John Ward Poole, Jaffrey, N. H.

Application September 1, 1934, Serial No. 742,443
Renewed January 24, 1938

13 Claims. (Cl. 196—13)

This invention relates to improvements in the processing of hydrocarbons and their derivatives particularly with respect to substances containing lubricating oils and asphalts, such as so-called mixed base petroleums.

More particularly an object of the invention is to provide a process of treatment of such substances that will effect a more efficient utilization of the raw material and will render commercial use of solvent extraction more profitable, by (a) increasing the production of premium grade products and conversely reducing the production of low grade and waste products; (b) by reducing or eliminating the use of acids or clay in the production of premium lubricants by solvent extraction; (c) by recovery of available asphalts and rendering them available in such form as to be valuable as commercial products.

A further object of the invention is to produce commercial asphalts of unusually high ductility and desirable penetration.

The use of selective solvents with respect to lubricants as agents for improving carbon residue, resistance to sludging, and resistance to change in temperature, is well known. In general, these processes consist in mixing the selective solvent with the petroleum cut, a mixture of hydrocarbons and their derivatives which is to be processed, in such manner as will result in the formation of two phases, an oil phase and a solvent phase, thereafter separating these phases either by means of settling and decantation, or by centrifugal separation. This procedure may be repeated as often as desired, or a series of stages, or a tower may be employed. In either case countercurrent flow of solvent and material to be extracted is usually maintained. Subsequent to the completion of the steps described above the solvent is removed from each phase separately, usually by means of distillation. The oil phase is then further processed for the production of a superior and improved lubricating oil, while the residue remaining from the removal of the solvent from the solvent phase has been considered as of small value and generally utilized as a heavy fuel.

Through my research I have discovered that when a petroleum substance carrying appreciable asphalt is extracted by such a process, employing only an extractive solvent without the concomitant use of a precipitative solvent, such as propane, that the bituminous constituents of the residue or extract from such solvent frequently possesses desirable qualities which may be utilized by proper further processing in the production of a commercial asphalt.

For better understanding of the properties and composition of this extract, it is necessary to understand more completely the action of an extractive solvent. It is a fact well established by myself through many years of research that:

(1) The solubility of hydrocarbons of any series in any selective solvent will decrease as the molecular weight increases, and (2) Assuming approximately constant molecular weight the solubility of hydrocarbons will increase with deviation from paraffinic characteristics; or in other words the solubility will increase as hydrogen carbon ratio and saturation decrease and as hydrocarbon derivatives are formed by the addition of oxygen, sulphur, and the like. It is understood that the term "hydrocarbon" is used in the broad sense to include not only true hydrocarbons, but also their naturally occurring derivatives.

In consequence, since the constituents of any petroleum cut or fraction, normally encountered in commercial operation, will vary both in molecular weight and in "paraffinicity", it is obvious that within certain limits these two rules of solution will work contrary to each other. However, a consideration of these two principles will show that for any given extract such portions of the extract as are appreciably "paraffinic" will be concentrated in the lower molecular weight or low boiling portion while the higher boiling portion will be comparatively lean in paraffinic material. In the case of a mixed base petroleum comprising appreciable quantities of both asphalt and high boiling paraffines the high boiling constituent of the extract will be predominantly bituminous. That such is the case, I have repeatedly demonstrated by my research.

It is well known that the presence of high melting paraffines is highly detrimental to asphalt particularly with respect to its ductility. In the normal production of asphalt from a crude petroleum comprising a considerable quantity of paraffines it is in consequence very difficult to produce an asphalt of high ductility by the common procedure of distillation. These facts have been confirmed by myself by experimentation and production of asphaltic products as described above, and by means of the knowledge secured through these experiments I have been able to arrive at certain novel and useful improvements in the production of asphalt from mixed base petroleum.

I have discovered that by reduction of an extract from a petroleum or petroleum fraction of the nature described above that bituminous material of extremely high ductility, but in general of poor melting point, can be produced. By such reduction these asphalts possess in themselves utility and a wide range of commercial application due to their resistance to fracture and are commercially valuable for uses in which the comparatively low melting point is unimportant.

Furthermore, I have discovered that bituminous material so produced may be blended with residual asphalt of high penetration produced by distillation from the same or other crude oils and that the blend will possess to a much greater degree than would be indicated by weighted averages, desirable characteristics of both constituents. For example, a Mid-Continent reduced crude was subjected to flash distillation at normal atmospheric pressure by introducing steam into the heating zone to aid in the vaporization, of such portion as could be vaporized, to produce as a residuum an asphalt equal in volume to approximately six per cent, on the basis of the topped crude charged, having a penetration at 77 degrees F. of 25, but of extremely poor ductility (15). Asphalt of such tests is typical of that normally produced from mixed base crude petroleum and due to the poor ductility possesses little value even as a low-grade cracking stock or fuel oil. I have discovered, however, that by blending this residual asphalt with approximately equal parts of the bituminous substance produced by the reduction of the extract from a lubricating fraction from the same crude stock by a suitable selective solvent, such as crotonaldehyde, an asphalt of 36 penetration could be produced having a ductility greatly in excess of the capacity of the standard testing machine for determination of this physical characteristic.

Furtherfore, I have discovered that by blending the same residual asphalt described above with much smaller quantities of extract bottoms of as high as 170 to 200 penetration at 77 degrees F. that the resulting blend will be but little different in penetration or melting point from the residual asphalt, but will possess ductility greatly in excess of the usual ductility specifications for commercial asphalt of such penetration and melting point.

The invention described above is useful and commercially profitable for different and specific types of conditions and may be used jointly with various other processing steps. For instance, the production of asphalt by the reduction of a selective solvent extract is useful directly in itself for the production of an asphalt for use under conditions where an abnormally high ductility is desirable and a comparatively low melting point may be tolerated. This type of asphalt will maintain a high ductility down to considerably lower temperatures than will a normal asphalt meeting commercial ductility specifications at 77 degrees F. However, for most uses it usually possesses an undesirably low melting point. Therefore, the invention is more generally useful when used as an auxiliary to various types of standard processes. In other words, its utility and value is unquestionably greatest as a means for producing a blending stock which will enable the refiner of mixed base crude petroleum to recover the asphaltic material from his raw material as an asphalt which is a valuable and salable product. Several examples of the process' value in the production of such a blending material are as follows:—

It is well known that the use of vacuum distilling equipment for the production of a highly viscous overhead cylinder stock has certain advantages inasmuch as by this means there is produced a raw lubricating stock which will require a less drastic and more easily imposed acid treatment with lower sludge losses than will a residual cylinder stock produced from the same mixed base crude petroleum comprising appreciable quantities both of asphalt and of paraffinic lubricants. Such an overhead stock will also produce a finished oil of reduced carbon residue. With many mixed base crudes, such a procedure is of questionable profit since the residuum so produced will possess no value except as a low-grade fuel, and frequently a small loss in the yield of viscous lubricants results from such distillation. However, by the invention herein described it is possible to convert this residuum to a salable asphalt and thereby increase the quantity and consequently the value of commercially useful products. Furthermore, in such cases wherein vacuum production of a viscous stock has already proven economical, the process will enable the refiner to still further increase his production of salable products of high sales value. The process is, in consequence, useful when operated solely for the production of blending asphalt.

The process is also useful in conjunction with solvent extraction of mixed base crude petroleum or its fractions for the production of a superior lubricating oil. The use of a selective solvent for the production of such superior lubricating oils frequently will involve a greater cost for the finished oil either due to the actual cost of operation of the solvent plant or by the reduction in yield of salable lubricants. It is, of course, true that a solvent extraction process removes a certain percentage of material ordinarily included in the finished lubricants, such material being that which is highest in carbon residue content and in constituents sensitive to change in temperature and to oxidation. In consequence, unless a considerable premium to compensate for the decreased yield may be secured for the resulting improved lubricants, solvent extraction may prove to be uneconomical. However, by the invention herein described it is possible to restore to some degree and, in some cases, to actually exceed the normal production of salable products of high value.

Frequently, the extract produced by a solvent extraction process may be separated by distillation into blending asphalt of the nature herein described, varying in yield from twenty to ninety per cent of the total value of extract and into a distillate varying from ten to eighty percent which may be finished to a neutral lubricating oil similar in characteristics to the type of lubricants known as Coastal oils. This distillate, provided it also is reduced to a heavier oil and the lightest portions either discarded for use as lubricants or recombined with a wax distillate for dewaxing, will require little or no dewaxing and can, in consequence, be finished easily and cheaply to produce a salable product, while the extract bottoms produced from the original reduction of the extract may be blended with residual asphalt in the manner above described to effect the results described.

Suitable flow charts illustrating graphically the manner in which the invention may be commercially utilized are shown in the accompanying drawings, in which, Fig. 1 is a chart illustrative of the utilization of the process for the purpose of producing a superior asphalt;

Figure 1:
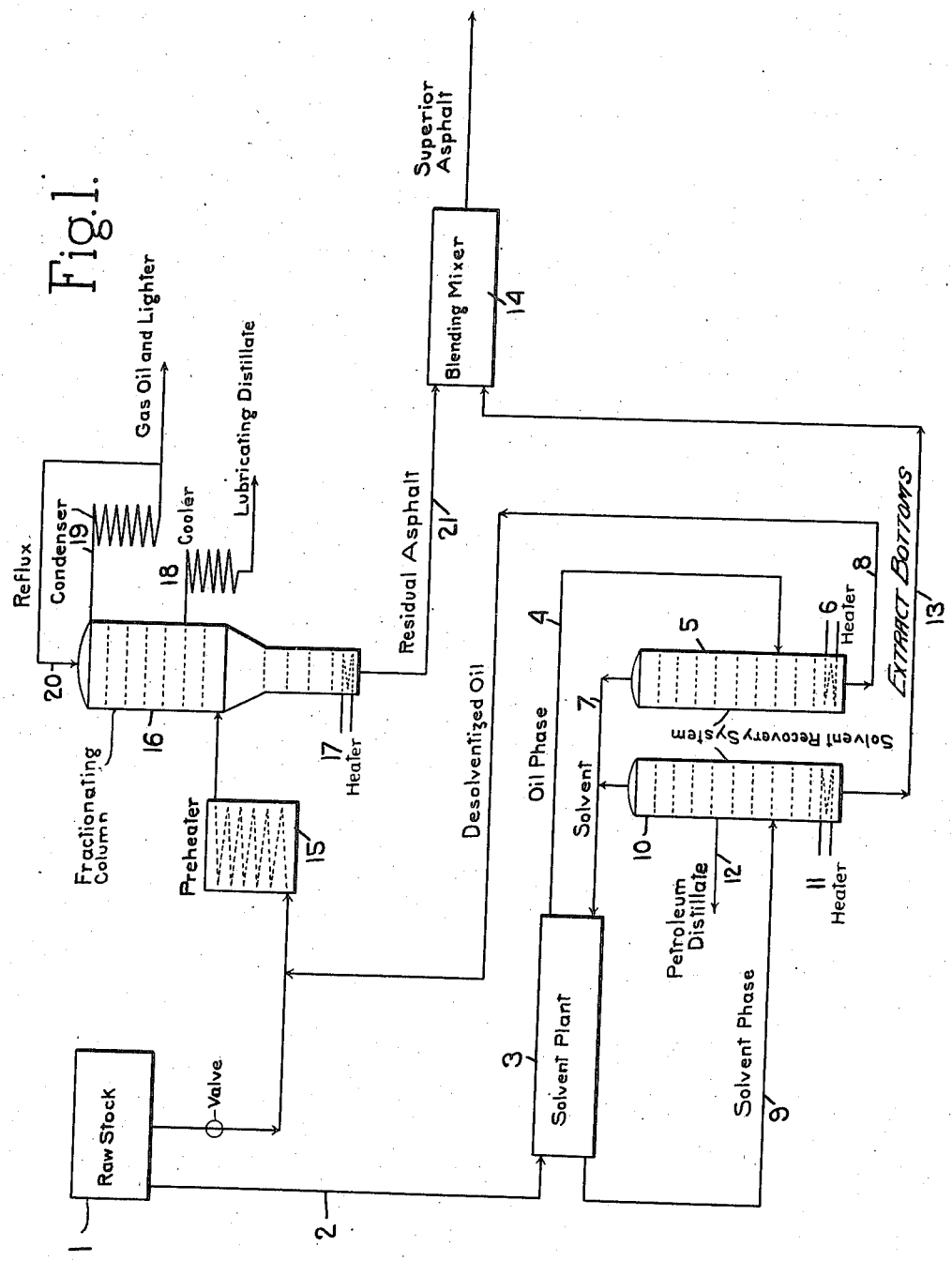

In the operation of the invention as graphically illustrated in Fig. 1, the petroleum substance containing lubricating oil and asphaltic material, which may be termed "raw stock", may be drawn from any suitable source, such as a supply tank 1 through a pipe 2 to a solvent plant 3 in which the raw stock is subjected to a suitable selective extracting solvent to produce an oil phase and a solvent phase. Any suitable extractive solvent can be used which is a solvent for aromatic and unsaturated hydrocarbons, and the like, possessing solvent power comparable to that of such solvents when normally employed to increase the paraffinicity of viscous paraffinic-base lubricating oils. Preferably the solvent possesses a solvent power markedly greater than that possessed by $SO_2$. Such suitable extractive solvents include nicrotonaldehyde, dichloroethylether, furfural, nitrobenzene, phenol, etc. The oil phase and the solvent phase may be separated in the solvent plant by settling or by centrifugal action. The oil phase may be carried from the solvent plant by a suitable pipe 4 to a fractionating column 5, such as a bubble tower, supplied with a suitable controllable heating unit 6, from the top of which the solvent may be returned through a pipe 7 to the solvent plant. The de-solventized oil phase or raffinate is discharged from the bottom of the tank through a suitable pipe 8 for further treatment, as will hereinafter more fully appear.

The solvent phase is conducted from the solvent plant through a pipe 9 to a fractionating column 10 which may be a bubble tower, provided near its bottom with a heating unit 11. The petroleum distillate may be drawn from the side of the tower at a suitable height through a discharge pipe 12 and may be utilized for cracking stock or the production of a Coastal-type lubricating oil. The bituminous substance which may be termed "extract bottoms" may be delivered continuously through a pipe 13 from the bottom of the fractionating column 10 and discharged into a blending mixer 14, such as a "Lancaster disperser" which comprises an apparatus in which the materials to be mixed are jointly delivered and passed through orifices in a series of successive stators and high speed rotors, thus shearing small increments from each phase and affording intimate contacts of the divided materials, equipped with necessary auxiliaries such as surge tanks, so that said bituminous substance will be blended with residual asphalt as will hereinafter more fully appear.

The de-solventized oil phase or raffinate, which is discharged from the bottom of the fractionating tower 5, desirably is passed through a preheater 15 into a fractionating column 16 having in its lower portion a suitable heater 17. The lubricating oil may be discharged as a side stream from the fractionating column 16 through a pipe 18 communicating therewith at a suitable point above the point of feed, and gas oil and lighter petroleum fractions may be discharged from the fractionating column through the pipe 19 communicating with the top of the column. At the top of the fractionating column 16, a suitable reflux is maintained through a pipe 20, preferably of a portion of the condensed gas oil distillate issuing from the pipe 19.

Residual asphalt is discharged from the bottom of the fractionating column through a pipe 21 into the blending mixer 14. The residual asphalt resulting from distillation of the raffinate is generally of a non-ductile character or of insufficient ductility to serve as a satisfactory commercial product, while the extract bottoms, which is supplied to the mixer from the bubble tower 10, is of extremely high ductility. Consequently, by properly proportioning the relative amounts of ductile bituminous material or extract asphalt delivered from the bubble tower 10 to the amount of residual asphalt delivered from the fractionating column 16 to the blending mixer, a superior asphalt having the desired ductility, melting point and penetration for commercial use can be readily obtained.

Figure 2:
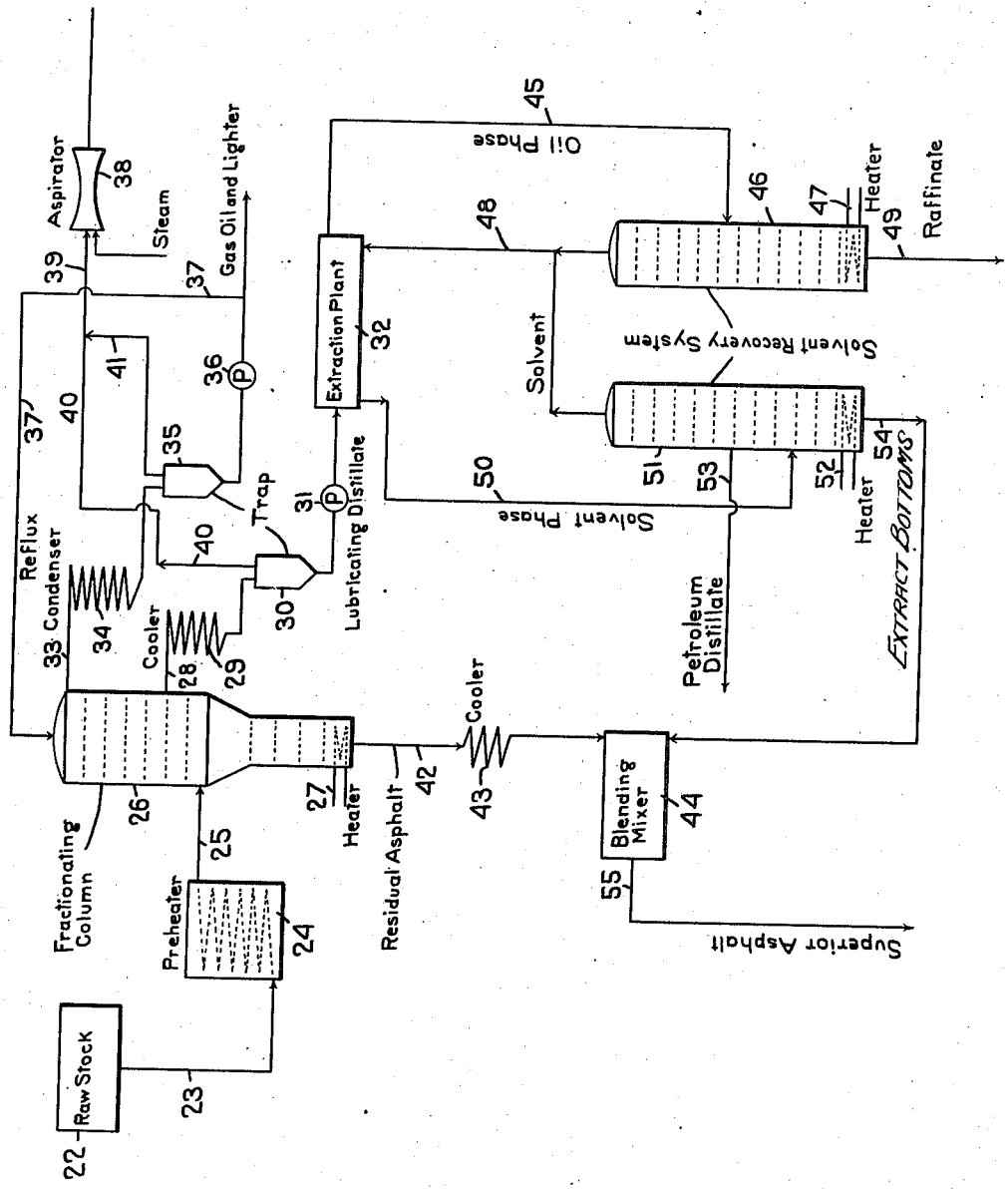
Fig. 2 is a similar chart illustrating the operation of the invention for the purpose of the production of a superior lubricating oil as well as for the production of a superior asphalt.

In the operation of the invention as graphically illustrated in Fig. 2, the petroleum substance or raw stock may be delivered from a suitable source, such as a supply tank 22, through a pipe 23, a pre-heater 24, and transfer line 25, to a fractionating column 26, preferably operated under vacuum and provided near its lower end with a reboiler 27, or other source of heat. Lubricating oil may be delivered from any suitable point above the point of feed through a pipe 28 to a cooler 29 and trap 30 from which it may be drawn by a pump 31 and discharged to a solvent extraction plant 32. The gas oil and lighter fractions are discharged from the upper portion of the fractionating column 26 through a pipe 33 through a condenser 34 to a trap 35 from which it is drawn by a pump 36, and a portion thereof is returned through a pipe 37 to the top of the fractionating column 26 to provide a reflux therethrough.

Suitable vacuum may be maintained in the fractionating column 26 by a steam jet aspirator or thermal condenser 38 connected by a suitable pipe 39 and branches 40 and 41 with the traps 30 and 35 respectively. By reason of this construction a continuous discharge of lubricating oil stock gas oil and lighter fractions may be maintained.

At the same time residual asphalt of insufficient ductility may be continuously discharged from the bottom of the fractionating column 26 through a pipe 42. The residual asphalt desirably is delivered through a cooler 43 to a blending mixer 44 of the character above described.

The lubricating stock, which is delivered from the fractionating column 26 through the pipe 28, cooler 29, trap 30, and pump 31 to the solvent plant 32, is subjected in the solvent plant to the action of a suitable selective extractive solvent of the character above described to produce an oil phase and a solvent phase which may be separated by any suitable means and the oil phase delivered from the solvent plant through a pipe 45 to a fractionating column 46 provided with a suitable heater 47. The solvent which is distilled from the oil phase desirably is delivered from the top of the fractionating tower 46 through a pipe 48 to the solvent plant where it is again utilized.

The raffinate which is delivered from the bottom of the fractionating tower 46 through a pipe 49 may thereafter be suitably processed for the production of a superior lubricating oil.

The solvent phase is delivered from the solvent plant through a pipe 50 to a fractionating tower 51 having in its lower portion a suitable heater 52 and the solvent which is distilled from the solvent phase passes from the upper end of the fractionating tower through a pipe to the solvent plant or to the pipe 48 which communicates with the solvent plant.

Petroleum distillate may be delivered from the fractionating tower 51 through a pipe 53 at a suitable point above the point of feed and may be utilized as cracking stock or for the production of a Coastal-type lubricating oil. The bituminous extract bottoms is delivered through the pipe 54 from the bottom of the fractionating tower 51 to the blending mixer 44. This bituminous material possesses such characteristics that when blended with the residual asphalt of insufficient ductility produced from the fractionating column 26, the resultant blend when properly proportioned will possess suitable ductility, penetration and melting point for commercial use, and may be discharged from the mixer 44 through the delivery pipe 55.

Figure 3:
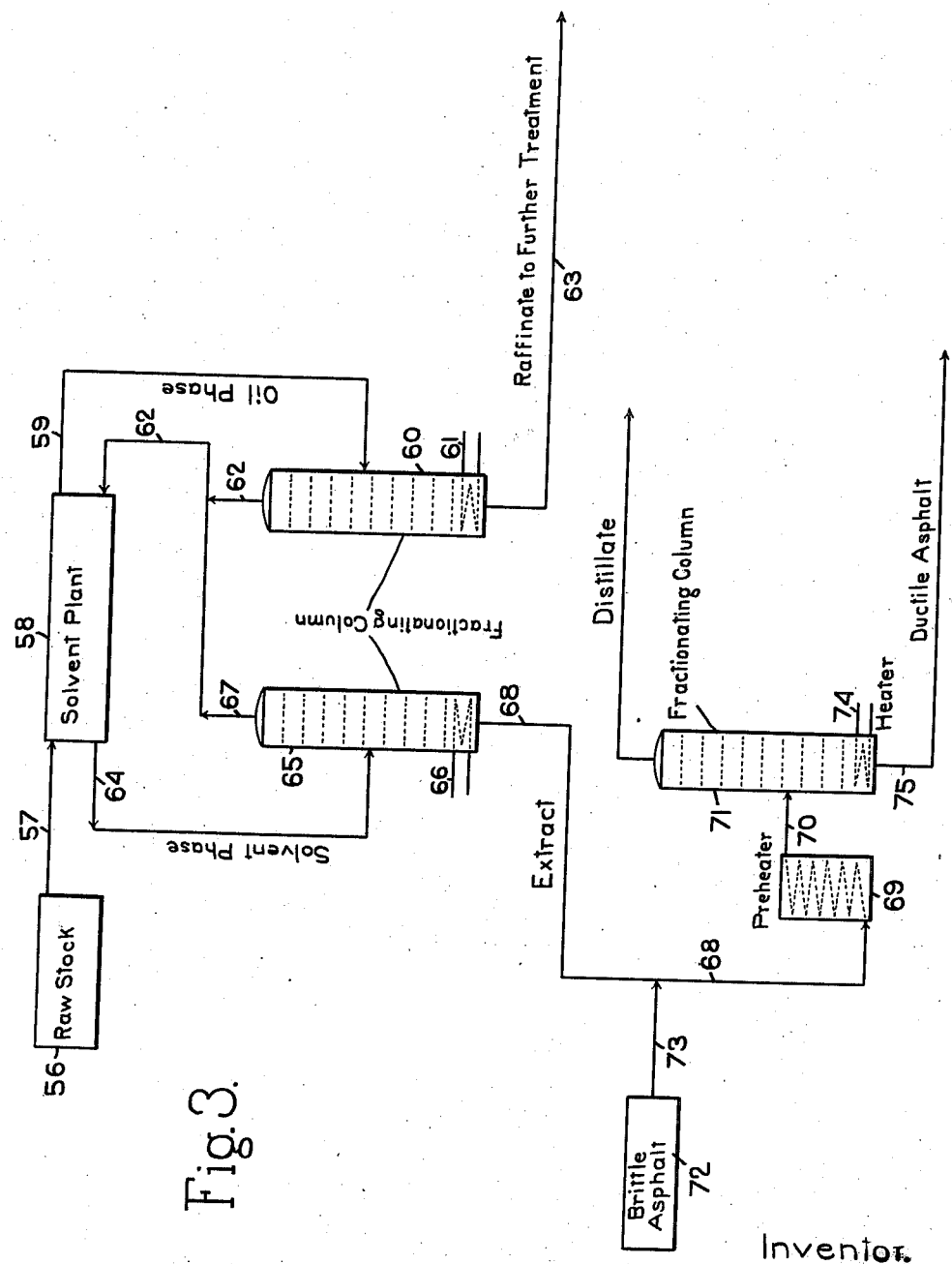
Fig. 3 is a similar chart illustrating an alternative method of producing a superior asphalt in conjunction with the production of a superior lubricating oil.

A further modification of the process heretofore described is graphically illustrated in Fig. 3, in which the raw stock is delivered from a suitable supply tank 56 through a pipe 57 directly into the solvent plant 58 in which it is treated by a suitable selective extractive solvent of the character above described to produce an oil phase and a solvent phase. The oil phase is delivered through a pipe 59 to a fractionating column 60 having in its lower portion a heater 61 and the solvent distillate from the oil phase is returned through a pipe 62 to the solvent plant for recovery and for re-use. The raffinate is delivered from the bottom of the fractionating column 60 through a pipe 63 for further treatment and the production of a superior lubricating oil.

The solvent phase is delivered from the solvent plant through a pipe 64 to a fractionating column 65 having in its lower portion a heater 66 and the solvent distilled from the solvent phase is delivered from the top of the fractionating column through a pipe 67 to the solvent plant or to the pipe 62 which communicates therewith. The extract is delivered from the bottom of the fractionating column through a pipe 68 to a pre-heater 69 from which it is conducted through a transfer line 70 to a fractionating column 71. Concurrently, non-ductile or insufficiently ductile asphalt, which may be produced in any desired manner, is delivered from a suitable supply 72 through a pipe 73 into the pipe 68 where it becomes mixed with the extract, and after being pre-heated therewith is delivered to the fractionating column 71. The fractionating column 71 is provided with a suitable heater 74 and the petroleum distillate is delivered from the top of the fractionating column and may be utilized as a cracking stock or for the production of a Coastal-type lubricating oil, as heretofore described. In this modification of the process, asphalt having a desired degree of ductility, penetration and melting point may be delivered directly through a pipe 75 from the lower end of the fractionating column. By properly controlling the amount of insufficiently ductile asphalt which is thus introduced into the extract, a continuous discharge may be maintained from the lower end of the fractionating column 71 of an asphalt of proper specifications.

The expressions "bituminous material" and "bituminous substance" as used herein and in the claims, are not intended to include within their scope native waxes or other highly paraffinic hydrocarbons.

It will be understood that the particular systems above described, which are utilized for the performance of the process, are of an illustrative character and that any suitable apparatus may be employed in the performance of the process. It will also be understood that the process may be employed by the substitution of batch apparatus in place of the continuous flow apparatus above described.

Having thus described the invention, what is claimed as new, and desired to be secured by Letters Patent, is:

1. The process of treating a petroleum substance containing bituminous material of high ductility which comprises mixing with said substance a selective solvent for aromatic and unsaturated hydrocarbons, possessing solvent power comparable to that of such solvents when normally employed to increase the paraffinicity of viscous paraffinic-base lubricating oils, under such conditions as will result in the formation of a solvent phase and an oil phase, separating the phases, recovering the solvent from the solvent phase to produce an extract, and subjecting said extract to distillation to produce therefrom a valuable distillate and a residuum in such proportions that the residuum will be a bituminous substance of high ductility, blending said residuum with an asphaltic substance of relatively low ductility to produce an asphaltic substance of higher ductility without undesirably decreasing its hardness.

2. The process of treating a petroleum substance containing lubricating oil and bituminous material of high ductility which comprises distilling said substance to produce a raw lubricating stock containing a substantial percentage of bituminous substances and as a residuum an asphalt of insufficient ductility, solvent extracting the distillate by means of a selective solvent for aromatic and unsaturated hydrocarbons, possessing solvent power comparable to that of such solvents when normally employed to increase the paraffinicity of viscous paraffinic-base lubricating oils, to produce an extract and a material which by virtue of such extraction can be finished to a superior lubricating oil, subjecting said extract to distillation to produce therefrom a valuable distillate and a residuum in such proportions that the residuum will be a bituminous substance of high ductility, blending the bituminous substance thus produced with the asphalt produced as a residuum from said distillation in such proportions as to produce an asphalt of high ductility and great hardness.

3. The process of treating a petroleum substance containing lubricating oil and bituminous material of high ductility which comprises distilling said substance to produce a distillate containing a substantial percentage of bituminous substances and as a residuum a hard asphalt of insufficient ductility, solvent extracting the distillate by means of a solvent for aromatic and unsaturated hydrocarbons possessing solvent power comparable to that of such solvents when normally employed to increase the paraffinicity of viscous paraffinic-base lubricating oils to produce an extract, subjecting the extract to distillation to remove therefrom non-bituminous constituents as a valuable distillate and produce a residuum which will be a highly bituminous substance of high ductility, blending the bituminous substance thus produced with said hard asphalt in such proportions as to produce a hard asphalt of desirably high ductility.

4. The process of treating a petroleum substance containing lubricating oil and bituminous material of high ductility which comprises distilling said substance under reduced pressure to produce a raw lubricating stock containing a substantial percentage of bituminous substances and as a residuum an asphalt of insufficient ductility, solvent extracting the distillate by means of a selective solvent for aromatic and unsaturated hydrocarbons, possessing solvent power comparable to that of such solvents when normally employed to increase the paraffinicity of viscous paraffinic-base lubricating oils to produce an extract and a material which by virtue of such extraction can be finished to a superior lubricating oil, subjecting the extract to distillation to produce therefrom a valuable distillate and a residuum in such proportions that the residuum will be a bituminous substance of high ductility, blending the bituminous substance thus produced with the asphalt produced as a residuum from said reduced pressure distillation in such proportions as to produce an asphalt of desirably high ductility and great hardness.

5. The process of treating a petroleum substance containing lubricating oil and bituminous material which comprises distilling said substance to produce a raw lubricating stock containing a substantial percentage of bituminous substances of high ductility and as a residuum an asphalt of insufficient ductility, solvent extracting the distillate by means of crotonaldehyde to produce an extract and a material which by virtue of such extraction can be finished to a superior lubricating oil, subjecting the extract to distillation to produce therefrom a valuable distillate and a residuum in such proportions that the residuum will be a bituminous substance of high ductility, blending the bituminous substance thus produced with the asphalt produced as a residuum from said distillation in such proportions as to produce an asphalt of great ductility and hardness.

6. The process of treating a petroleum substance containing lubricating oil and bituminous material which comprises distilling said substance to produce a raw lubricating stock containing a substantial percentage of bituminous substances of high ductility and as a residuum an asphalt of insufficient ductility, solvent extracting the distillate by means of dichloroethyl-ether to produce an extract and a material which by virtue of such extraction can be finished to a superior lubricating oil, subjecting the extract to distillation to produce therefrom a valuable distillate and a residuum in such proportions that the residuum will be a bituminous substance of high ductility, blending the bituminous substance thus produced with the asphalt produced as a residuum from said distillation in such proportions as to produce an asphalt of great ductility and hardness.

7. The process of treating a petroleum substance containing lubricating oil and bituminous material which comprises distilling said substance to produce a raw lubricating stock containing a substantial percentage of bituminous substances of high ductility and as a residuum an asphalt of insufficient ductility, solvent extracting the distillate by means of furfural to produce an extract and a material which by virtue of such extraction can be finished to a superior lubricating oil, subjecting the extract to distillation to produce therefrom a valuable distillate and a residuum in such proportions that the residuum will be a bituminous substance of high ductility, blending the bituminous substance thus produced with the asphalt produced as a residuum from said distillation in such proportions as to produce an asphalt of great ductility and hardness.

8. A composition of matter comprising residual asphalt of insufficient ductility to serve as a satisfactory commercial product mixed with a quantity sufficient to overcome insufficient ductility and not exceeding an equal volume of an extracted hydrocarbon plasticizer produced by mixing with a petroleum substance containing bituminous material of high ductility a selective solvent for aromatic and unsaturated hydrocarbons which possesses solvent power comparable to that of selective solvents when normally employed to increase the paraffinicity of viscous paraffinic base lubricating oils under such conditions as will result in the formation of a solvent phase and an oil phase, recovering the solvent from the solvent phase to produce an extract and distilling the extract to produce a bituminous substance of high ductility which constitutes said plasticizer, the resulting mixture being an asphaltic substance of high ductility and great hardness.

9. A composition of matter comprising residual asphalt of insufficient ductility to serve as a satisfactory commercial product mixed with a quantity sufficient to overcome insufficient ductility and not exceeding an equal amount of hydrocarbon plasticizer comprising a bituminous substance composed of the highly ductile hydrocarbon constituents of an extract phase formed by extracting a petroleum substance containing bituminous material of high ductility with a selective solvent for aromatic and unsaturated hydrocarbons which possesses solvent power comparable to that of selective solvents when normally employed to increase the paraffinicity of viscous paraffinic-base lubricating oils under such conditions as will result in the formation of a solvent phase and an oil phase.

10. A composition of matter comprising residual asphalt of insufficient ductility to serve as a satisfactory commercial product mixed with a small quantity of a hydrocarbon plasticizer comprising a bituminous substance composed of the highly ductile hydrocarbon constituents of an extract phase formed by extracting a petroleum substance containing bituminous material of high ductility with a selective solvent for aromatic and unsaturated hydrocarbons which possesses solvent power comparable to that of selective solvents when normally employed to increase the paraffinicity of viscous paraffinic-base lubricating oils under such conditions as will result in the formation of a solvent phase and an oil phase.

11. A composition of matter comprising residual asphalt of insufficient ductility to serve as a satisfactory commercial product mixed with a small quantity of a hydrocarbon plasticizer comprising a bituminous substance composed of the highly ductile hydrocarbon constituents of an extract phase formed by extracting a petroleum substance containing bituminous material of high ductility with a selective solvent having the essential solvent action as between constituents of hydrocarbon oil of a solvent selected from the group consisting of crotonaldehyde, dichlorethyl ether, furfural, nitrobenzene and phenol.

12. The process of treating a petroleum substance containing bituminous material of high ductility which comprises extracting said substance with a selective solvent for aromatic and unsaturated hydrocarbons possessing solvent power comparable to that of such solvents when normally employed to increase the paraffinicity of viscous paraffinic-base lubricating oils under such conditions as will result in the formation of a solvent phase and an oil phase, forming an extract phase comprising bituminous material, separating from said extract phase a bituminous fraction of high ductility, blending said fraction with an asphaltic substance of relatively low ductility to produce an asphaltic substance of higher ductility without undesirably decreasing its hardness.

13. The process of treating a petroleum substance containing bituminous material of high ductility which comprises extracting said substance with a solvent having the essential selective solvent action as between constituents of hydrocarbon oil of a solvent selected from the group consisting of crotonaldehyde, dichlorethyl ether, furfural, nitrobenzene and phenol, forming an extract phase comprising bituminous material, separating from said extract phase a bituminous fraction of high ductility, blending said fraction with an asphaltic substance of relatively low ductility to produce an asphaltic substance of higher ductility without undesirably decreasing its hardness.

JOHN WARD POOLE.